United States Patent
Stahl

(10) Patent No.: US 8,299,387 B2
(45) Date of Patent: Oct. 30, 2012

(54) METHOD AND SYSTEM FOR GENERATING GRAPHIC ELEMENTS

(75) Inventor: Brett A. Stahl, Grosse Pointe Farms, MI (US)

(73) Assignee: Stahls' Inc., St. Clair Shores, MI (US)

(*) Notice: Subject to any disclaimer, the term of this patent is extended or adjusted under 35 U.S.C. 154(b) by 614 days.

(21) Appl. No.: 12/567,269

(22) Filed: Sep. 25, 2009

(65) Prior Publication Data

US 2011/0073573 A1    Mar. 31, 2011

(51) Int. Cl.
*B23K 9/00* (2006.01)
(52) U.S. Cl. ............... 219/69.11; 219/69.17; 219/121.44
(58) Field of Classification Search ......... 219/69.11–17, 219/121.4
See application file for complete search history.

(56) References Cited

U.S. PATENT DOCUMENTS

| | | | | |
|---|---|---|---|---|
| 4,735,827 A * | 4/1988 | Frank et al. | .................. | 427/264 |
| 4,794,698 A * | 1/1989 | Fassett, II | ...................... | 33/18.1 |
| 5,304,410 A * | 4/1994 | Webster | ...................... | 428/41.8 |
| 5,598,202 A * | 1/1997 | Peterson | ....................... | 347/213 |
| 6,106,645 A * | 8/2000 | Stempien | ........................ | 156/64 |
| 6,225,026 B1 * | 5/2001 | Lifshitz et al. | ............... | 430/308 |
| 7,054,708 B1 * | 5/2006 | Aamodt et al. | ............... | 700/122 |
| 7,164,490 B2 * | 1/2007 | Manico et al. | ............... | 358/1.18 |
| 2006/0228151 A1 * | 10/2006 | Vogel | .......................... | 400/621 |
| 2007/0011861 A1 * | 1/2007 | Kosuge et al. | .................. | 29/559 |
| 2007/0231525 A1 * | 10/2007 | Bodwell et al. | ............. | 428/40.1 |

* cited by examiner

*Primary Examiner* — Michael Lebentritt
(74) *Attorney, Agent, or Firm* — Rader, Fishman & Grauer PLLC

(57) ABSTRACT

A method for cutting a graphic into a graphic material is disclosed. The method includes automatically controlling a cutting device to cut a desired graphic shape into a graphic material and automatically adjusting the cutting depth of the cutting device between at least a shallower cutting depth and a deeper cutting depth substantially contemporaneously with the cutting the desired graphic shape into the material.

8 Claims, 4 Drawing Sheets

METHOD AND SYSTEM FOR GENERATING GRAPHIC ELEMENTS

TECHNICAL FIELD

The present disclosure relates to visual graphics, and more particularly to graphics such as numbers, letters, licensed characters, figures, and other images, that are applied to garments and other textiles.

BACKGROUND

Graphics, such as letters, numbers, licensed characters, figures, and other images are commonly attached to garments and other textiles. Some graphics are adhered to garments using various methods, including heat transfer techniques. These adhesion-type graphics are commonly manufactured commercially from a blank "sheet" of material, many times stored in and retrieved from large rolls of material. The "sheet" material is typically comprised of a graphic layer, which may be cotton, plastic, film, polyester or some other material, and a carrier layer or backing substrate, commonly made from Mylar or plastic. FIG. 1 illustrates a roll 10 of known graphic/carrier material 11, which includes an upper graphic material 12 and an underlying carrier material 14. The graphic layer 12 is usually releasably adhered to the carrier layer 14. The graphic layer 12 comprises the layer of material from which the desired graphics will be cut, and the carrier layer 14 is used to maintain the shape of the graphic and/or the tackiness of the back side of the graphic at all times until the graphic is applied to a garment, i.e., during transport and all other forms of handling. The blank graphic/carrier material 11 is usually automatically unrolled into an automated machine that cuts graphics into the continuous roll of material and then cuts the continuous roll of material into "sheets" that can more easily be sold, transported and handled.

Various commercially-viable techniques exist for cutting graphics into blank graphic/carrier material. One such exemplary system is illustrated in FIG. 2. System 20 includes an electronic controller 22 and an automated cutting machine 24. The system 20 may also include input/output devices 28 and a display device 26 connected to the controller 22. The electronic controller 22 may be a known electronic controller, such as a central processing unit of a computer, for example. Automated cutting machine 24 typically includes an apparatus, such as a bracket arm 23, for storing the roll 10 of graphic/carrier material 11 and allowing the material to be pulled through the cutting machine 24. The cutting machine 24 includes a cutting device 29, such as a laser. The cutting device may also be a knife blade or other similar device capable of cutting material. The cutting device 29 may be configured to be moved laterally across the material 11 to cut a graphic 25, e.g., "O", into the material 11 as it is pulled longitudinally through the machine 24. The controller 22 is programmed to cause the cutting device 29 to cut the desired graphic shapes into the graphic layer 12 without cutting the carrier layer 14. To effectively cut the outline of the graphic 25 into the graphic material 12 without cutting the underlying carrier material 14, the cutting device 29 must be precisely positioned and controlled to a constant cutting force and/or energy level.

The inventors hereof have recognized an aspect of this type of process that results in inefficiency with respect to certain letters, such as "A", "B", "D", "O", "Q", and "R", for example, and other letters, numbers and graphics that have a fully-enclosed open void area within the graphic. The inefficiency results from the fact that waste graphic material filling the area of the graphic intended to be a fully-enclosed open void area remains in place on the carrier material after the graphic has been cut into the graphic material. As a result, it is common for commercial manufacturers of these types of graphics to manually "weed" the waste graphic material filling the fully-enclosed open void area from the carrier material. For example, a worker may use tweezers to manually remove the already-cut waste graphic material from the carrier material. FIG. 3A illustrates a graphic "O" cut into a graphic material 11 prior to "weeding." The waste graphic material 34 of the void area is still in place on the carrier material 14. FIG. 3B illustrates the graphic "O" from FIG. 3A after the "weeding" process, where the waste graphic material 34 has been removed and the carrier material 14 shows through the void area. The manual "weeding" process is time consuming, and, as a result, costly.

The inventors hereof have devised a method and system for creating graphics from a graphic material having an underlying carrier material that reduces the need for post-cutting manual "weeding" of graphics that have a fully-enclosed open void area, and, as a result, is more efficient and cost-effective.

DETAILED DESCRIPTION

A method is described herein to cut graphics from a graphic material attached to an underlying carrier material such that any fully-enclosed open void areas of the graphic are automatically cut and removed from the graphic, which reduces the need for post-cutting manual "weeding" of waste graphic material filling the void area of the graphic. The system variably controls the automated cutting device, e.g., laser or knife blade, to multiple pressures and/or cutting energies such that the cutting pressure/energy is sufficient to cut the upper graphic material but not the underlying carrier material when the automated cutting device outlines the outer perimeter of the graphic and such that the cutting pressure/energy is sufficient to cut both the upper graphic material and the underlying carrier material when the cutting device outlines the perimeter of the void area.

Figure 1:
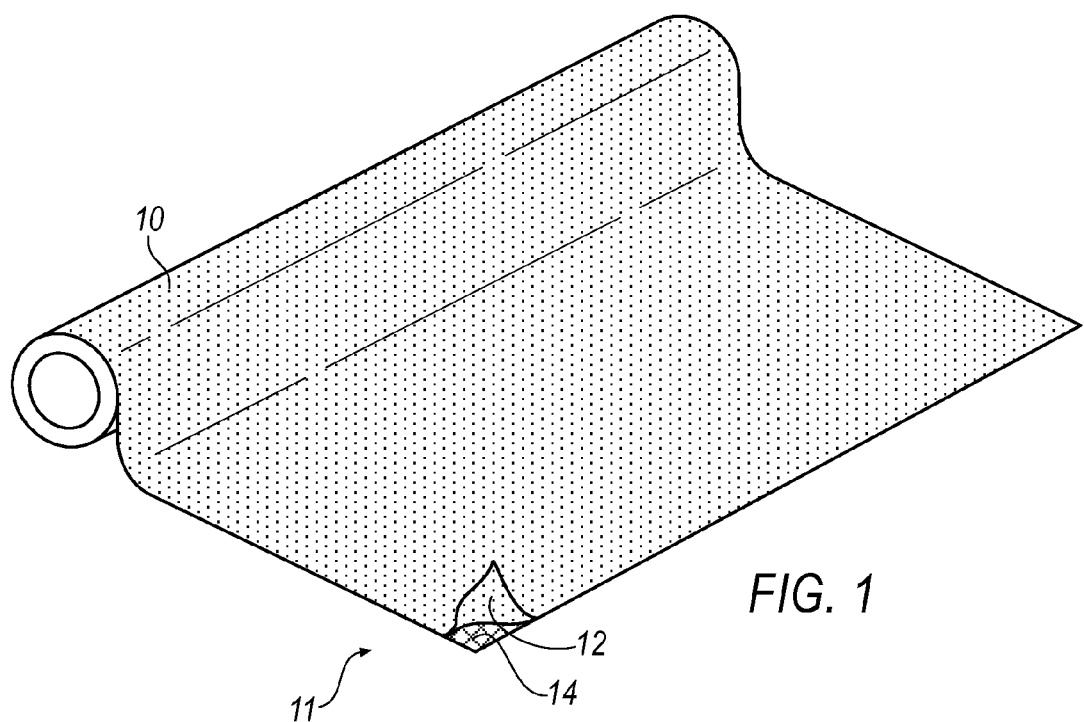
FIG. 1 illustrates an exemplary roll of graphic/carrier material, including a graphic layer and a carrier layer.
Figure 2:
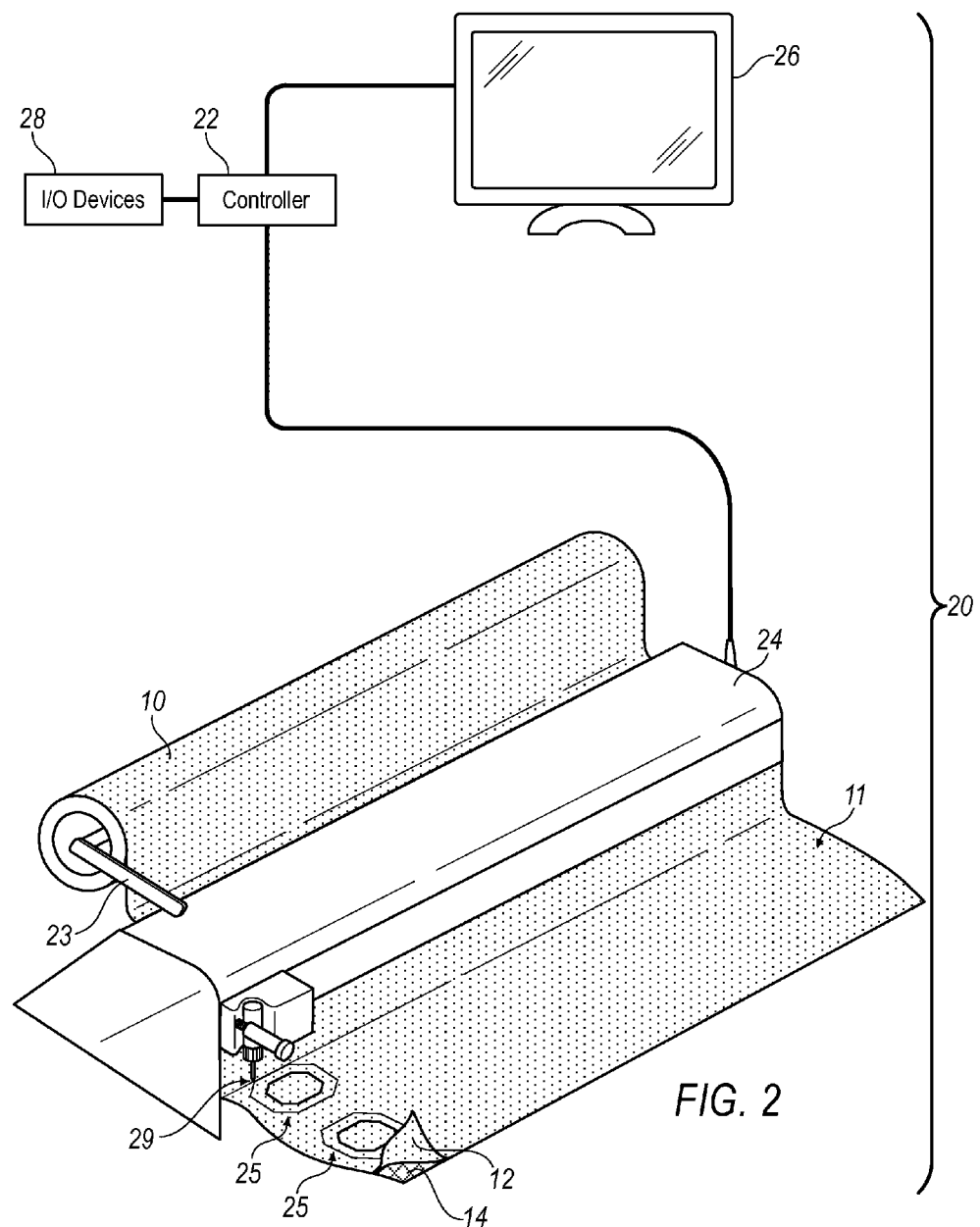
FIG. 2 illustrates an exemplary automated cutting system.
Figure 3A:
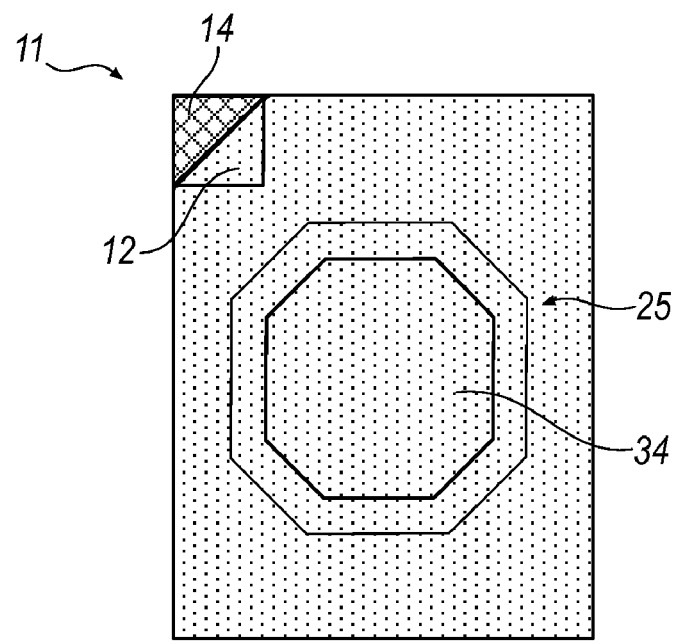
FIG. 3A illustrates a graphic that has been cut into the graphic material prior to a manual "weeding" process.
Figure 3B:
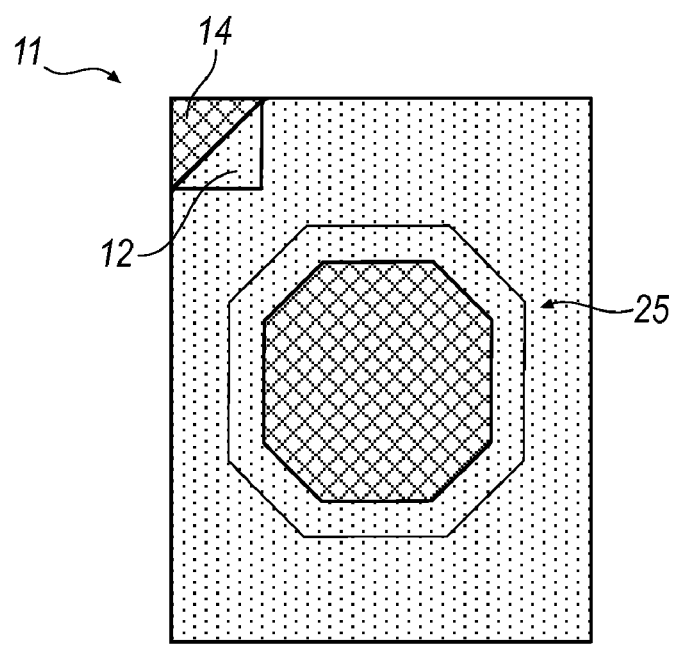
FIG. 3B illustrates the graphic of FIG. 3A after the manual "weeding" process to eliminate the graphic material in the void area.

Known automated graphic cutting systems, like that shown in FIG. 2 may be (but does not have to be) used to implement the inventive method described herein by modifying the manner in which the automated cutting device is controlled. The pressure and/or cutting energy of the automated cutting device may be controlled in hardware and/or software.

Figure 4:
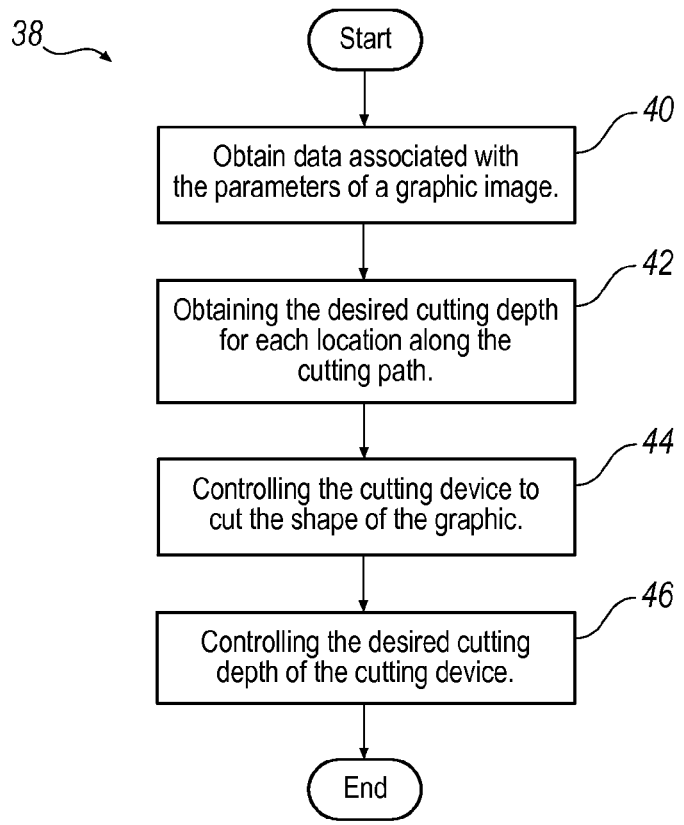
FIG. 4 is a flowchart setting forth exemplary steps to carrier out an exemplary improved process for cutting graphics.

An exemplary method 38 of cutting graphics is described in the flowchart of FIG. 4. Starting at step 40, data associated with the parameters of a graphic image to be cut are communicated to electronic controller 22 (FIG. 2). Those parameters are generally known to those skilled in the art and include parameters sufficient to define the shape, size, and configuration of the graphic to be cut from the graphic material. At step 42, the cutting pressure/energy is obtained for each location along the cutting path for the desired graphic. The desired cutting pressure/energy can be obtained by storing such data as part of the graphic parameters and communicating it to the controller 22 or alternatively by the controller 22 calculating and determining the desired cutting pressure/energy for each location based on the other graphic parameters communicated to the controller 22. In most applications, there will be two desired cutting pressures/energies. The first will be a lower pressure/energy, sufficient to cut the top graphic material but not cut the underlying carrier material. The second will be a higher pressure/energy, sufficient to cut deeper through both the graphic material and the carrier material. At step 44, the controller 22 uses the graphic parameters to position and control the cutting path of the automated cutting devices so as to cut the graphic material in the shape of the graphic. At step 46, which is generally performed substantially contemporaneously with step 44, the controller 22 automatically adjusts the cutting depth of the cutting device. In one embodiment, the controller causes the automated cutting device to apply the lower cutting pressure/energy when tracing the outer perimeter of the graphic and to apply the higher cutting pressure/energy when tracing the perimeter of the fully-enclosed void area of the graphic.

Figure 5:
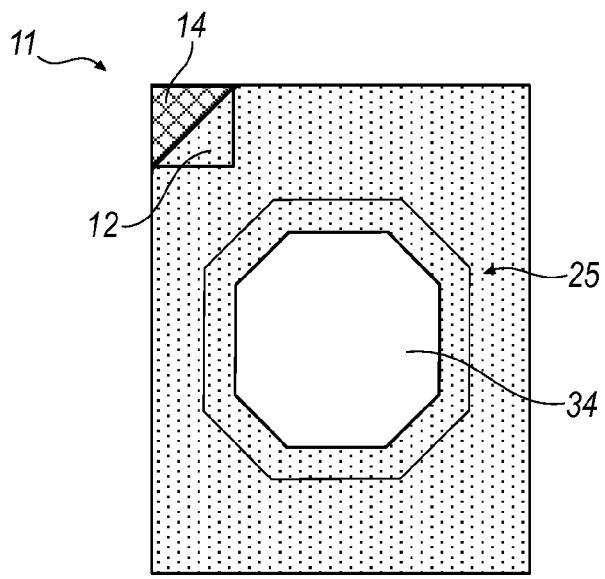
FIG. 5 illustrates a resulting graphic created employing the exemplary improved method described herein.

Implementing the above-described method will result in elimination of both the upper graphic material and the underlying carrier material from the fully-enclosed void area of the graphic during the automated manufacturing process. FIG. 5 illustrates a graphic "O" created with the described process. As shown, the outer perimeter of the "O" is cut into the upper graphic material 12 but not through the underlying carrier material 14. The perimeter of the interior void area has been cut all the way through both the upper graphic material 12 and the underlying carrier material 14. Thus, both the graphic material 12 and the carrier material 14 are eliminated from the void area of the graphic. As a result, there will be a reduced need for subsequent manual "weeding" of the sheets of graphics.

The preceding description has been presented only to illustrate and describe exemplary embodiments of the methods and systems. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

The invention claimed is:

1. A method for cutting a graphic, comprising:
   automatically controlling a cutting device to cut a desired graphic shape into a graphic material; and
   automatically adjusting the cutting depth of the cutting device between at least a shallower cutting depth and a deeper cutting depth substantially contemporaneously with cutting the desired graphic shape into the material.

2. The method of claim 1, wherein the graphic material is attached to an underlying carrier material and wherein the shallower cutting depth is sufficient to cut through the graphic material but not to cut into the carrier material.

3. The method of claim 2, wherein the deeper cutting depth is sufficient to cut through both the graphic material and the underlying carrier material.

4. The method of claim 3, wherein the cutting device is controlled to cut to the shallower cutting depth around the outer perimeter of the graphic and to cut to the deeper cutting depth around the perimeter of an interior void area of the graphic.

5. The method of claim 1, wherein the cutting device is a laser, and the step of automatically adjusting the cutting depth comprises adjusting the energy applied by the laser.

6. The method of claim 1, wherein the cutting device is a knife blade, and the step of automatically adjusting the cutting depth comprises adjusting the cutting pressure applied by the knife blade.

7. The method of claim 1, wherein the cutting device is controlled to cut to the shallower cutting depth around the outer perimeter of the graphic and to cut to the deeper cutting depth around the perimeter of an interior void area of the graphic.

8. A method of cutting a graphic from an upper graphic material that is attached to an underlying carrier material, comprising:
   automatically controlling a cutting device to cut a desired graphic shape into the graphic material;
   automatically adjusting the cutting depth of the cutting device to cut through just the upper graphic material, but not cut into the underlying carrier material, around the outer perimeter of the graphic; and
   automatically adjusting the cutting depth of the cutting device to cut through both the upper graphic material and the underlying carrier around the perimeter of an internal void area of the graphic.

* * * * *